July 10, 1951  C. X. HOSFORD  2,560,443
WEEDING AND CULTIVATING ATTACHMENT FOR TRACTORS
Filed March 17, 1949  2 Sheets-Sheet 1
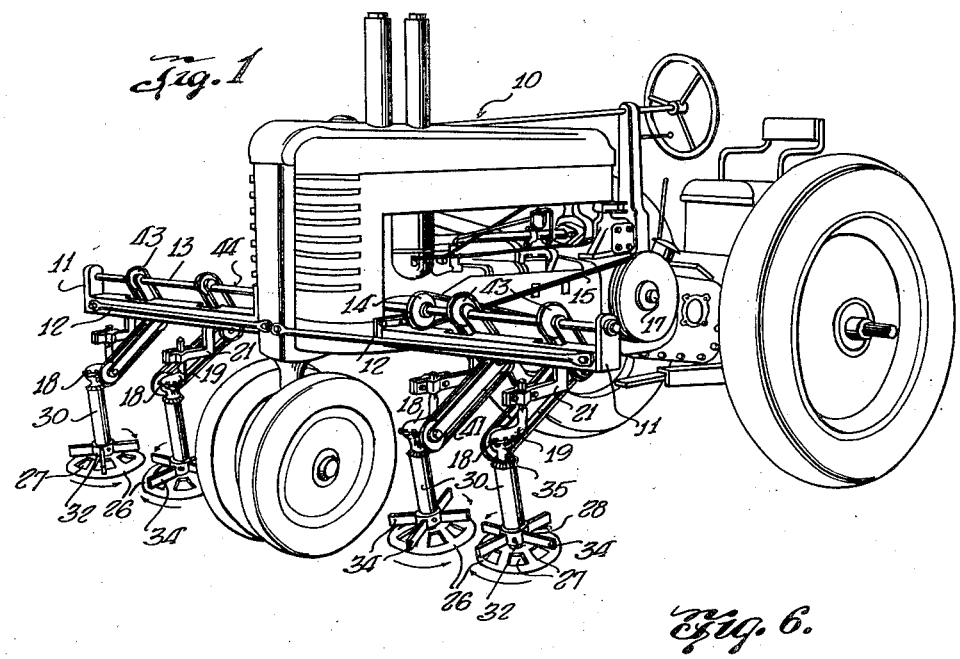
Clarence X. Hosford
INVENTOR.
ATTORNEY

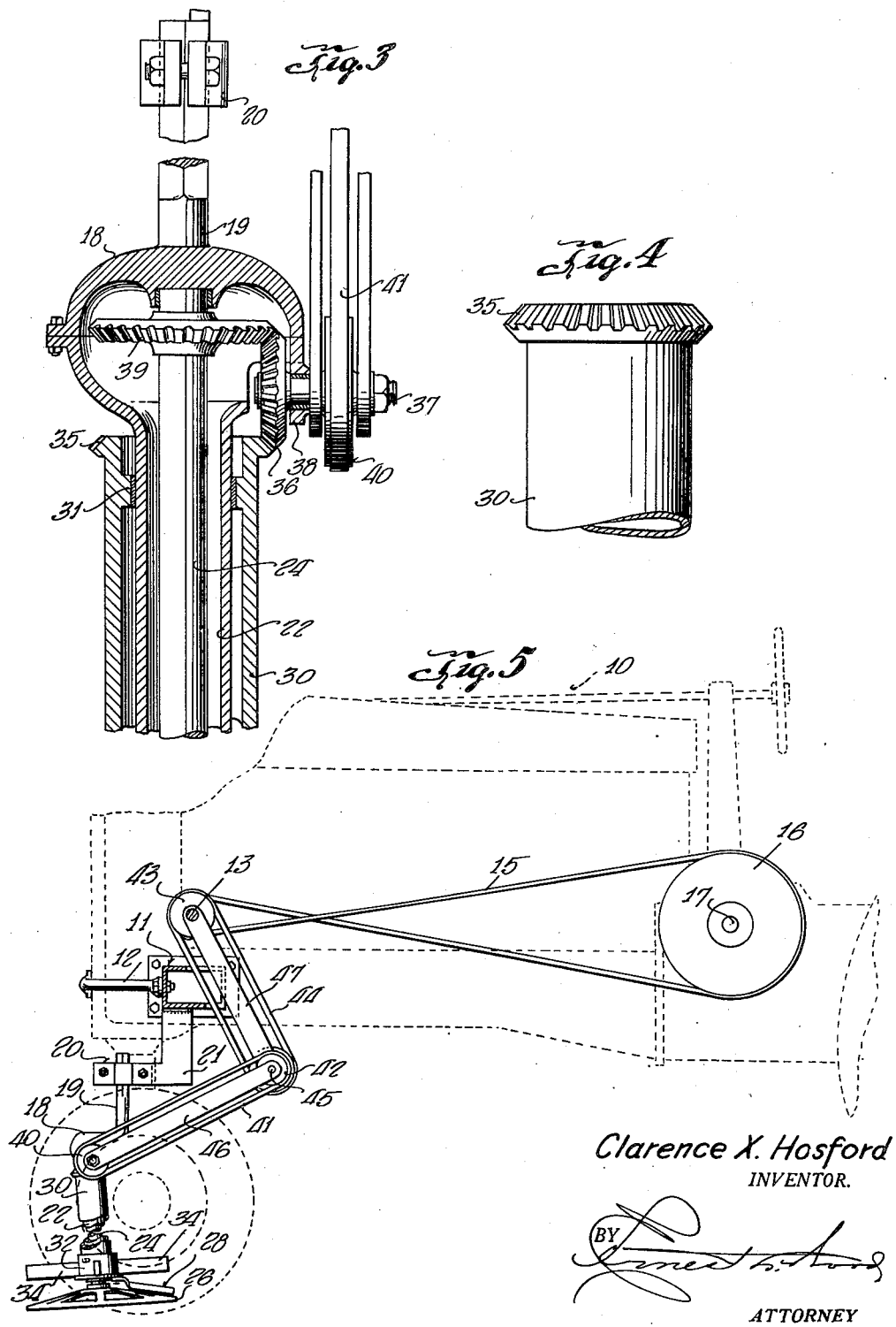

Patented July 10, 1951

2,560,443

UNITED STATES PATENT OFFICE 2,560,443

WEEDING AND CULTIVATING ATTACHMENT FOR TRACTORS

Clarence X. Hosford, Red Oak, Tex.

Application March 17, 1949, Serial No. 81,918

4 Claims. (Cl. 97—43)

This invention relates to agricultural implements and more particularly to a weeder and cultivator attachment for tractors.

The principal object of the invention is to provide a cultivating attachment consisting of a pair of elements cooperating to turn soil on each side of a row of plants in a circular motion toward the plants and thus remove noxious vegetation. Complementary to each of the aforementioned elements and disposed thereabove on the said axis is a blade adapted to rotate counter to the element and is effective to divert excessive soil away from the plants in the row. All of the foregoing is accomplished in a single operation, leaving the row comparatively free of weeds and the plants in good stand.

Another object of the invention is to provide a plow consisting of two pairs of soil engaging elements, each element consisting of a shaft carrying on its lower end an open disc adapted to operate in a plane inclined to the horizontal and surrounding the shaft is a hollow shaft carrying on its lower end a series of radially disposed blades adapted to rotate in a direction counter to that of the disc in order to continuously thrust excessive soil away from the row of plants.

Still another object of the invention is to provide a novel mechanism for driving the disc plows and blades from the power take-off of a tractor.

With the foregoing objects in view, the invention has further reference to certain features of accomplishment which will become apparent as the description proceeds, taken in connection with the accompanying drawings wherein:

Figure 1 is a front perspective view of a tractor showing an attachment thereon embodying the invention.

Figure 2 is a view of one of the weeding and cultivating elements in vertical section.

Figure 3 is a fragmentary sectional view of the weeding and cultivating element on a slightly larger scale and rotated 90° from the showing thereof in Figure 2.

Figure 4 is a fragmentary elevational view of the hollow shaft carrying the soil replacing blades.

Figure 5 is a side elevational view of the invention in its entirety shown on a tractor disclosed fragmentarily in dotted lines, and Figure 6 is a sectional view taken on line 6—6 of Figure 2.

Continuing with a more detailed description of the drawing, reference numeral 10 denotes generally a tractor of conventional manufacture. To each side of the front portion of the tractor frame is affixed a laterally extending mounting member 11, each having a brace rod 12 extending from its outer end to the front of the tractor where it is bolted, as shown in Figures 1 and 5. Mounted on and in parallelism with the members 11 and of the combined lengths of these members is a shaft 13 on which is mounted a drive pulley 14, the latter being driven by a belt 15 which is crossed and engaged with a pulley 16, mounted on the side power take-off 17 of the tractor.

Referring now to the weeding and cultivating elements; it will be observed in Figure 1 that these elements are arranged in pairs, one pair on each side of the tractor and adapted to plow a row of plants. Each of the elements consists of a housing 18 having an arm 19 formed on the upper section thereof which is directed outwardly and upwardly and squared at its upper end for adjustable reception by a clamp 20 (Figure 5) carried by a hanger 21. The hangers 21 are affixed to the underside of mounting members 11 in spaced relationship.

Formed on and depending from the lower section of each housing 18 is a tubular member 22 having an internal flange 23 at its lower end which embraces a shaft 24 extending through the tubular member 22. The lower end of shaft 24 is threaded for reception by an interiorly threaded boss 25 formed in the center of a disc plow 26, the latter having openings 27 therein to prevent accumulations of soil on the top thereof. As a further precaution against soil attaching itself to the upper surface by the disc, a scraper blade 28 is affixed at one end to a spacer flange 29, retained by threads exteriorly of the tubular member 22, and extends radially outward to the outer edge of the disc. The blade 28 is of course stationary while the disc 26 revolves.

The flange 29 supports the lower end of a hollow shaft 30 which embraces the tubular member 22 and further serves to maintain spaced relationship between the hollow shaft 30 and member 22 at their lower ends. Spacing of these elements at their upper ends is accomplished by an annular protuberance 31, formed on the inner surface of the hollow shaft 30 near its top, as shown in Figure 2.

Surrounding the hollow shaft 30 at its lower end is a collar 32, secured by a set screw 33. A series of radial blades 34 are affixed to the collar 32 and are adapted to operate above the disc 26 for the purpose to be presently made clear.

At the upper end of the hollow shaft 30 is formed a gear 35 with which meshes a gear 36. The gear 36 is mounted on a stub shaft 37, journaled in a bearing 38 formed on one side of the housing 18, as shown in Figure 3. The gear 36, in turn, meshes with a gear 39, mounted on the upper end of the shaft 24 which carries on its lower end the disc plow 26. The gears 36 and 39 are enclosed in the housing 18 and thus are protected against premature wear by the abrasive action of soil.

Returning to the driving mechanism for the described devices; a pulley 40 (Fig. 3) is mounted on the stud shaft 37 and is driven by a belt 41 from a pulley 42 (Fig. 5), the latter, in turn, being driven from a pulley 43, mounted on the drive shaft 13. A belt 44 engages the pulleys 42 and 43.

The pulley 42 of each unit is mounted on an individual stub shaft 45 and these shafts are each supported by parallel arms 46 which extend between the unit housing 18 and shaft 42 and a similar pair of parallel arms 47, extending between the stub shaft 42 and the drive shaft 13, as shown in Figure 5. The pivotal mounting of the pairs of parallel arms 46 and 47 make possible the vertical adjustment of the several units as provided for through the slidable connection between the arm on shank 19 and the hanger clamp 20.

In Figure 2 is shown the operating angle of the shafts of the units which is such as to dispose the disc plows 26 in a plane slightly inclined to the horizontal so that soil displaced thereby will have a tendency to fall towards the row of plants being weeded. The discs of each pair rotate in counter directions as indicated by the arrows in Figures 1 and 2 and the rotation of each soil diverting element, that is, the blades 34 in relation to its respective disc is opposite to that of the disc. Such opposed rotation of the respective soil diverting elements insures that the plants fill not be covered up by the operation.

Manifestly, the construction as shown and described is capable of some modification and such modification as may be construed to fall within the scope and meaning of the appended claims is also considered to be within the spirit and intent of the invention.

What is claimed is:

1. A cultivator attachment for a tractor comprising mounting members extending transversely from each side of said tractor, a drive shaft parallel with said mounting members and adapted to be driven from the power take-off of said tractor, a series of cultivating units depending in spaced relationship from said mounting members, each comprising a shaft, an open disc on the lower end of said shaft, a hollow shaft embracing said first shaft, a series of radially bladed elements carried by the lower end of said hollow shaft, a stationary tubular member intermediate said first shaft and said hollow shaft, a scraper blade on the lower end of said tubular member and overlying said disc and means actuated from said drive shaft for rotating said discs and said bladed elements in opposite directions.

2. An agricultural attachment for a tractor comprising a mounting and a series of soil engaging units depending from said mounting in spaced relationship, each consisting of a shaft, a disc on the lower end of said shaft, a stationary tubular member embracing said shaft, a scraper blade on said tubular member overlying said disc, a hollow shaft rotatably embracing said tubular member, a rotary bladed element carried by the lower end of said hollow shaft and means for rotating said bladed element and disc in counter directions.

3. A weeder and plant cultivator comprising a disc plow and a shaft therefor arranged to dispose said disc in a plane inclined to the horizontal, means for rotating said shaft, a hollow shaft rotatably embracing said first shaft, a stationary tubular member substantially coextensive with said hollow shaft and arranged between the latter and said first shaft, a rotary element carried by said hollow shaft having radially disposed blades operable above said disc plow, means for operating said rotary element in a direction counter to that of said disc plow to divert from the plants excess soil displaced by said disc plow, and a scraper blade stationarily mounted on the lower end of said tubular element and disposed between the rotary bladed element and disc plow to prevent accumulation of soil on the latter.

4. An agricultural attachment for a tractor including a pair of cooperating soil engaging elements, each consisting of a shaft, a disc supported on the lower end of said shaft in a plane inclined to the horizontal, a hollow shaft embracing said first shaft, a collar on the lower end of said hollow shaft having a series of radial blades thereon, a stationary tubular member substantially coextensive with and enclosed by said hollow shaft, a mounting affixed to said tractor and supporting said pair of soil engaging elements, means for rotating the disc supporting shaft and said hollow shaft in counter directions and means carried by said tubular member for scraping soil from the upper surface of said disc as the latter is rotated.

CLARENCE X. HOSFORD.

REFERENCES CITED

The following references are of record in the file of this patent:

UNITED STATES PATENTS

| Number | Name | Date |
|---|---|---|
| 405,169 | Malton | June 11, 1889 |
| 1,755,004 | Hoskins | Apr. 15, 1930 |
| 2,088,141 | Royston | June 27, 1937 |

FOREIGN PATENTS

| Number | Country | Date |
|---|---|---|
| 381,504 | Great Britain | Oct. 6, 1932 |